United States Patent
Niu et al.

(10) Patent No.: US 7,209,754 B2
(45) Date of Patent: Apr. 24, 2007

(54) METHOD AND APPARATUS FOR DETERMINING THE LOCATION OF A NODE IN A WIRELESS TITLE SYSTEM

(75) Inventors: Feng Niu, Weston, FL (US); Spyros Kyperountas, Weston, FL (US); Qicai Shi, Coral Springs, FL (US); David B. Taubenheim, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 206 days.

(21) Appl. No.: 11/057,874

(22) Filed: Feb. 14, 2005

(65) Prior Publication Data
US 2006/0181458 A1    Aug. 17, 2006

(51) Int. Cl.
*H04Q 7/20*    (2006.01)
(52) U.S. Cl. .................. 455/456.1; 455/115.3; 455/404.2
(58) Field of Classification Search ............. 455/456.1, 455/12.1, 115.3, 404.2; 702/150
See application file for complete search history.

(56) References Cited

U.S. PATENT DOCUMENTS 6,246,861 B1 *    6/2001    Messier et al. ............ 455/12.1

\* cited by examiner

*Primary Examiner*—Duc M. Nguyen
*Assistant Examiner*—Wayne Cai

(57) ABSTRACT

A method and apparatus for determining the location of a node within a communication system is provided herein. During operation, reference nodes (105) having known locations are utilized to locate "blind" nodes (104) whose location is to be determined. More particularly, a blind node (104) wishing to determine its location will measure a plurality of path losses between itself and a plurality of reference nodes (105). These reference nodes' locations will then be mathematically weighted by the path loss between these reference nodes (105) and the blind node (104). The location of the blind node (104) is a sum of the mathematically weighted reference nodes' locations.

15 Claims, 2 Drawing Sheets

100

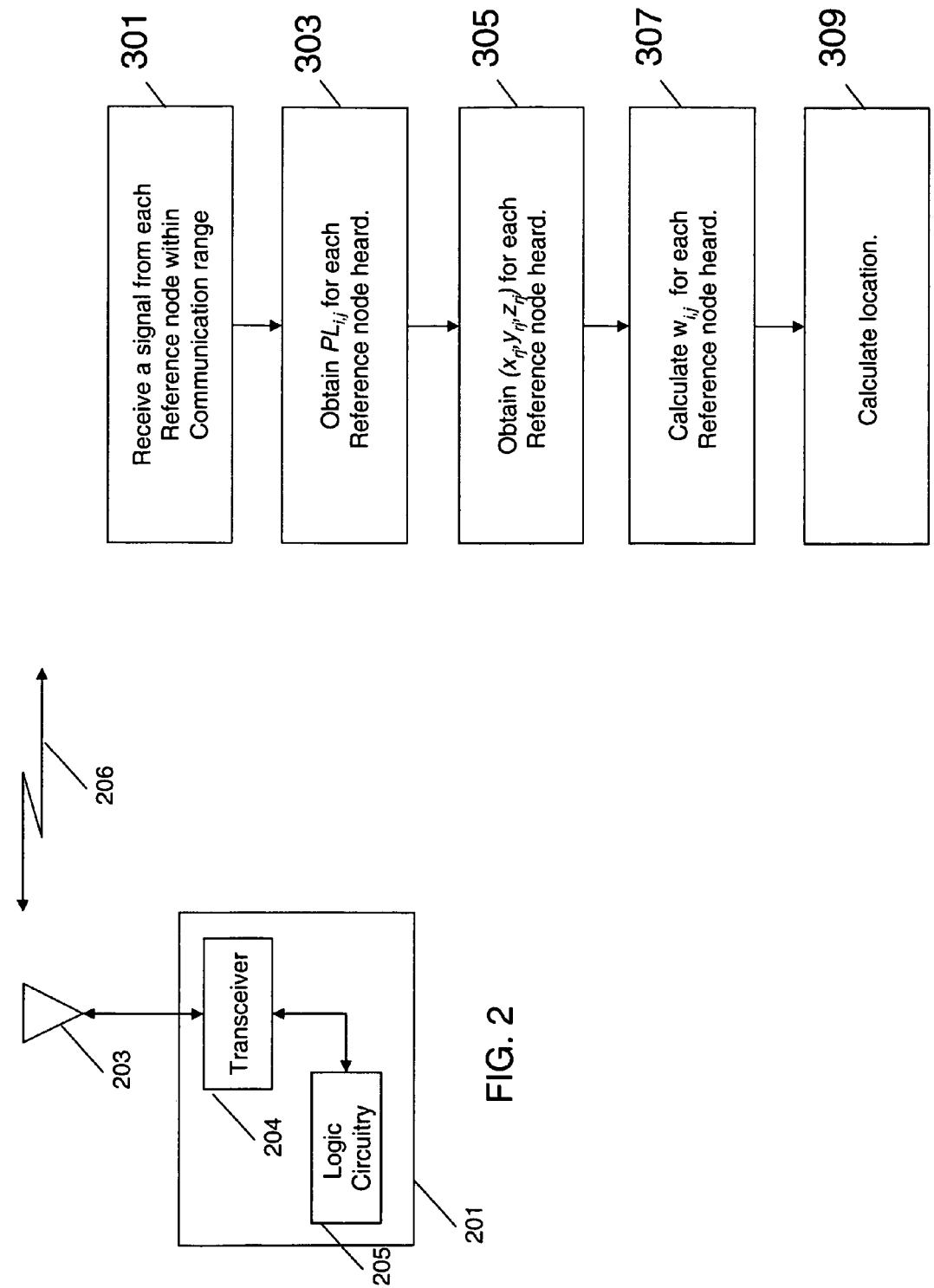

METHOD AND APPARATUS FOR DETERMINING THE LOCATION OF A NODE IN A WIRELESS TITLE SYSTEM

FIELD OF THE INVENTION

The present invention relates generally to radiolocation and in particular, to a method and apparatus for determining the location of a node within a wireless communication system.

BACKGROUND OF THE INVENTION

A variety of systems have been proposed that call for the ability to determine the location of an object within a wireless communication system. For example, in asset control, it is desirable to know the locations of objects (e.g., laptop computers, cell phones, . . . , etc.) within the confines of an office building. Prior-art wireless location techniques run the gamut from space-consuming, expensive circuitry that provides very accurate location estimates, to inexpensive, non-space-consuming circuitry that provides very gross location estimates. As is evident, there typically exists a tradeoff between accurate location techniques that are space-consuming and expensive to implement, and less expensive non-space consuming techniques that provide less accurate location estimates. It would be beneficial to improve on a less-expensive approach so that a more accurate determination of location can be made with very little added circuitry. Therefore a need exists for a method and apparatus for determining the location of an object within a wireless communication system that is relatively inexpensive, yet provides accurate location estimates. The object whose location is to be determined may be, for example, the wireless communication device itself or the device coupled to an object of interest.

BRIEF DESCRIPTION OF THE DRAWINGS

FIG. 2 is a block diagram of a node equipped to determine its location via path loss measurements.

FIG. 3 is a flow chart showing operation of the node of FIG. 2.

DETAILED DESCRIPTION OF THE DRAWINGS

Figure 1:
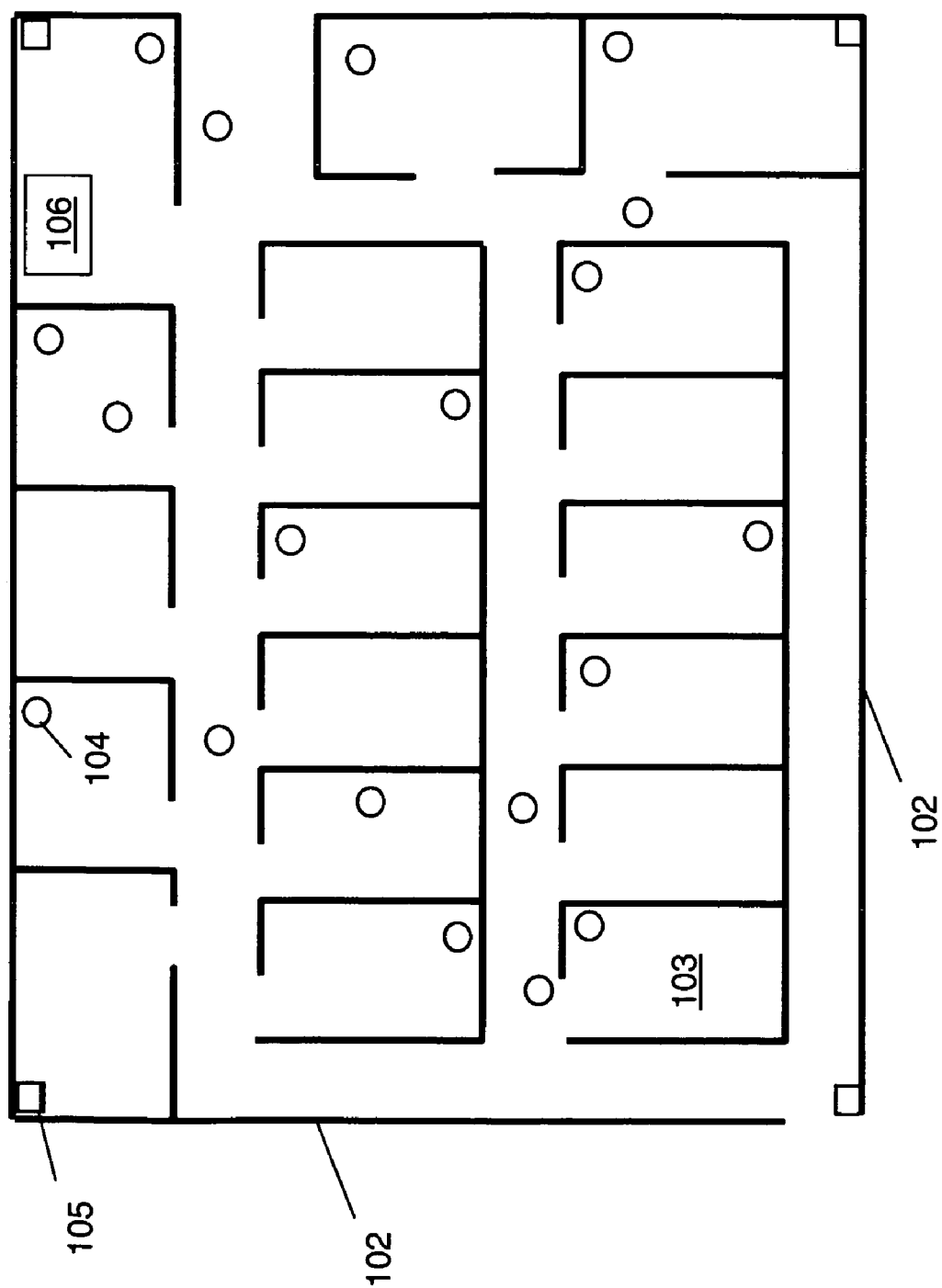
FIG. 1 is illustrates a typical floor plan of an office building in which are located a number of wireless devices involved in determining each other's location.

In order to address the above-mentioned need, a method and apparatus for determining the location of an object within a wireless communication system is provided herein. During operation, "reference" nodes are utilized to locate "blind" nodes. "Reference" nodes are nodes having known locations, while "blind" nodes are nodes having unknown locations or otherwise wishing to determine their locations. A blind node wishing to determine its location will measure a plurality of path losses between itself and a plurality of reference nodes. Each reference node's location will then be mathematically weighted by the path loss between the reference node and the blind node. The location of the blind node is a sum of the weighted reference nodes' locations.

In such systems, a "node" refers to radio device that is part of the wireless network. Nodes may be coupled to objects, such as inventory in a warehouse, so that the locations of the objects can be known. Of course, one of ordinary skill in the art will recognize that the location of a node may be determined either while the node is alone or while it is coupled to another object.

The present invention encompasses a method for determining the location of a blind node within a wireless communication system. The method comprises the steps of receiving a plurality of over-the-air signals from a plurality of reference nodes having known locations, determining a plurality of locations for the plurality of reference nodes, determining a plurality of path losses between the blind node and the plurality of reference nodes, and determining a plurality of mathematical weights based on the plurality of path losses. The pluralities of locations are weighted with the plurality of weights and the location of the blind node is calculated based on the weighting.

The present invention additionally encompasses a method for determining a location ($L_i$) of a blind node i within a wireless communication system. The method comprises the steps of receiving a plurality of over-the-air signals from j reference nodes having known locations, determining a plurality of locations ($L_{r,j}$) for the j reference nodes, determining a plurality of path losses ($PL_{i,j}$) between the node i and the j reference nodes, and determining a plurality of mathematical weights ($w_{i,j}$) based on the plurality of path losses. The plurality of locations are weighted with the plurality of weights and the location of the blind node i ($L_i$) is calculated based on the weighting.

Finally, the present invention encompasses an apparatus comprising a receiver receiving a plurality of over-the-air signals from j reference nodes having known locations and logic circuitry calculating the location of a blind node i ($L_i$). The logic circuitry performs location estimation by determining a plurality of locations ($L_{r,j}$) for the j reference nodes, determining a plurality of path losses ($PL_{i,j}$) between the node i and the j reference nodes, determining a plurality of mathematical weights ($w_{i,j}$) based on the plurality of path losses, weighting the plurality of locations with the plurality of weights, and calculating the location of the blind node i ($L_i$) based on the weighting.

Turning now to the drawings, wherein like numerals designate like components, FIG. 1 is a block diagram of communication system 100 deployed over a floor plan of an interior of an office building. Communication system 100 comprises a number of wireless devices 104–106 involved in determining a particular node's location. The office building comprises perimeter wall 102 that encloses a plurality of offices 103 (only one labeled).

Circular objects, or nodes 104 (only one labeled) represent wireless devices, the locations of which are unknown and to be determined. Because the location of nodes 104 are unknown, these nodes 104 are referred to as "blind" nodes. Nodes 104 can include, for example, transceiver security tags attached to valuable assets such as lap top computers, or be embedded in wireless communication devices including cellular telephones.

Rectangular objects 105 (only one labeled) represent reference nodes. The locations of nodes 105 are known, or can be easily and accurately determined to within some measurement accuracy (e.g., via physical measurement or via GPS). Reference nodes 105 are utilized in determining the locations of blind nodes 104. In a first embodiment of the present invention, all calculations involved in determining the location of a blind node take place within the blind node itself, however in an alternate embodiment, a processing node 106 serves as location-finding equipment (LFE) to perform calculations involved in determining the location of blind nodes 104.

It should be noted that although FIG. 1 shows nodes 104–106 existing within a two-dimensional space, one of ordinary skill in the art will recognize that nodes 104–106 may be located in other environments, including 3-dimensional spaces. For example, nodes 104 may comprise golf carts equipped with wireless transceivers located on a golf course. In a similar manner, nodes 104 may comprise inventory located within a multi-level warehouse. Irrespective of the environment where nodes 104 operate, reference nodes 105 are dispersed in known locations to assist in locating blind nodes 104.

As described above, a variety of systems have been proposed for locating blind nodes 104. A problem exists in that accurate location of nodes 104 requires expensive circuitry. In order to address this issue, a location technique is utilized that uses located devices 105 to locate nodes 104. In order to improve on prior-art location techniques, a path loss (PL) is utilized to accurately determine a blind node's location. More particularly, a path loss between a blind node i and a reference node j is utilized to generate a weighting factor $w_{i,j}$. The weighting factor is utilized in a generic weighted average algorithm for estimating the location of a blind node i. The location $L_i$ of node i is given as:

$$\overline{L}_i = \frac{\sum_j w_{i,j} * \overline{L}_{rj}}{\sum_j w_{i,j}},$$

where $L_i$ is the location of blind node i, $L_{r,j}$ is the location of reference node j, and $w_{i,j}$ is a weighting factor.

In the preferred embodiment of the present invention the location of node i ($L_i$) comprises the coordinates ($x_i$, $y_i$, $z_i$), with the location of a particular reference node j ($L_{r,j}$) comprising ($x_{rj}$,$y_{rj}$,$z_{rj}$) coordinates. It should be noted that in alternate embodiments of the present invention, vectors $L_i$ and $L_{r,j}$ can take other forms such as simple (x,y) coordinates, or polar coordinates. With (x,y,z) coordinates being utilized for location, the above equation takes the form of:

$$(x_i, y_i, z_i) = \frac{\sum_j w_{i,j} * (x_{rj}, y_{rj}, z_{rj})}{\sum_j w_{i,j}}, \tag{1}$$

where $L_i$=($x_i$, $y_i$, $z_i$), and $L_{r,j}$=($x_{rj}$,$y_{rj}$,$z_{rj}$).

In prior-art systems, the weight $w_{i,j}$ usually depends on the distance between the ith blind node and jth reference node and is traditionally given as follows:

$$w_{i,j} = \frac{1}{d_{i,j}}, \text{ or } \frac{1}{d_{i,j}^2}, \tag{2}$$

where $d_{i,j}$ is a distance measure between the ith blind node and jth reference node. However, in a preferred embodiment of the present invention $w_{i,j}$ is based on a path loss (PL), and is defined as:

$$w_{i,j}=(PL_{max}-PL_{i,j})^q, \tag{3}$$

$PL_{i,j}$ is the measured path loss between node i and reference node j, and is a difference between the reference node's transmitted power ($P_t$ in dBm) and the received signal strength ($P_r$ in dBm), measured by the blind node. Thus, for example if the received signal strength is −75 dBm and the transmitted power is 0 dBm, the path loss is 75 dB, or $$PL=10*\log_{10}(P_t)-10*\log_{10}(P_r). \tag{4}$$

$PL_{max}$ is a maximum possible path loss between a blind node and a reference node. If all nodes 104–105 have the same receiver sensitivity and the same transmit power ($P_T$), then $PL_{max}$ is the same for each blind node 104. This "global" $PL_{max}$ is $$PL_{max}=P_T(\text{dBm})-(\text{receiver sensitivity in dBm}) \tag{5a}$$

Thus, for example, in the case where the transmitting power is 0 dBm and receiver sensitivity is −95 dBm, PLmax is 95 dB.

In the situation where nodes 104–105 have differing receiver sensitivity and transmit power, a local $PL_{max}$ or $PL_{ij,max}$ is the maximum path loss between the ith blind node and the jth reference node or simply determined by the following formula $$PL_{i,j,max}=(\text{transmitter power of the jth reference node dBm})-(\text{receiver sensitivity of the ith blind node in dBm}). \tag{5b}$$

In equation 3, q is an exponent used to generate $w_{i,j}$ based on the propagation environment. For a simplified propagation model such as $$PL=A+10*n*\log_{10}(d) \tag{6}$$

where A is a constant determined by the path loss at 1 meter and d is the distance (in meters) between the transmitter and receiver, the value of q can be related to the value of n. The value of q is set to 1 if n>3.5 and the value for q is set to >4 if n<2.5. If n is 2.5<n<3.5 then 1<q<4. When there is no prior knowledge about the propagation environment, q=3. The values proposed here only serve as an example, and in no way are meant to limit the values assigned to q.

FIG. 2 is a block diagram of blind node 201 equipped to determine its location via path loss measurements. In a preferred embodiment of the present invention blind node 201 comprises antenna 203 coupled to transceiver 204, in turn, coupled to logic circuitry 205. Although various forms for antenna 203, transceiver 204, and logic circuitry 205 are envisioned, in a preferred embodiment of the present invention blind node 201 is formed from a Freescale Inc. MC13192 transceiver 204 coupled to a Motorola HC08 8-bit processor 205. When blind node 201 wishes to determine its location, it receives over-the-air communication signal 206 transmitted from reference nodes 105. Communication signal 206, received from reference nodes 105 comprises a physical location of reference node 105 (e.g., ($x_{rj}$,$y_{rj}$,$z_{rj}$) components) for each reference node 105. Once received by transceiver 204, the physical location for each reference node 105 are extracted from over-the air signal 206. Signal 206 is further analyzed to determine a path loss between each reference node 105 and node 104. Calculations for $w_{i,j}=(PL_{max}-PL_{i,j})^q$ for each reference node j are made and $(x_j,y_j,z_j)$ coordinates are determined per equation (1) by blind node 201.

As discussed above, in an alternate embodiment of the present invention, blind node 201 may simply pass path loss measurements and $(x_{rj},y_{rj},z_{rj})$ components to location finding equipment 106 through the network. Location finding equipment 106 may then compute $(x_j,y_j,z_j)$ coordinates per equation (1).

FIG. 3 is a flow chart showing operation of the blind node of FIG. 2 during location estimation. The logic flow begins at step 301 where transceiver 204 receives a plurality of over-the-air signals from a plurality of reference nodes 105 within communication range. At step 303 a plurality of path losses ($PL_{i,j}$) between node i and reference node j are determined by circuitry 205. More particularly, circuitry 205 determines a path loss between the blind node and each reference node. As discussed, $PL_{i,j}$ is the difference between the reference node's transmitted power and the received signal strength as measured by the blind node.

At step 305 a plurality of physical locations are calculated by circuitry 205 for the plurality of reference nodes. In the preferred embodiment of the present invention the physical locations are extracted from the over-the-air signal and comprise $(x_{rj},y_{rj},z_{rj})$ components, however in alternate embodiments of the present invention other forms of physical location may be obtained. For example, simple two-dimensional $(x_{rj},y_{rj})$ components may be utilized. At step 307 circuitry 205 calculates a plurality of weights ($w_{i,j}$) for the plurality of reference nodes. Finally, at step 309, a location estimate ($L_i$) is made by circuitry 205 by weighting the plurality of physical locations. As discussed, the location estimate ($L_i$) is based on the path loss between each reference node and the blind node. More particularly, $$(x_i, y_i, z_i) = \frac{\sum_j w_{i,j} * (x_{rj}, y_{rj}, z_{rj})}{\sum_j w_{i,j}}.$$

While the invention has been particularly shown and described with reference to a particular embodiment, it will be understood by those skilled in the art that various changes in form and details may be made therein without departing from the spirit and scope of the invention. For example, in some cases, it may be desirable to perform radiolocation calculations without using microprocessor resources. One skilled in the art recognizes that a hardware implementation of the invention is readily targeted toward integrated circuit fabrication processes in which logic functions are feasible. Examples of such fabrication processes include UMC or Freescale 90 nanometer CMOS. A hardware implementation is preferably but not necessarily integrated with a transceiver in a system-on-chip (SoC).

In a further embodiment of the present invention alternative values for $w_{i,j}$ are possible. For example $w_{i,j}$ may be set equal to the values shown below in equation (7).

$$w_{i,j}=(s_{max}-s_{i,j})^q, \quad (7a)$$

$$w_{i,j}=PL_{i,j}^{-q}, \quad (7b)$$

$$w_{i,j}=s_{i,j}^{-q}, \quad (7b)$$

where the variable $s_{i,j}$ can be related to $PL_{i,j}$ via the following formula $$s_{i,j} = 10^{\left(\frac{PL_{i,j}-A_o}{10n_o}\right)}, \quad (8a)$$

$$s_{max} = 10^{\left(\frac{PL_{max}-A_o}{10n_o}\right)}. \quad (8b)$$

In equations 7 and 8, the preferred choice of parameters is $A_o=40$ and $n_o=4$. Note that $s_{i,j}$ is a variable found to be good for weighted average calculation and may have nothing to do with the distance between the nodes even though the formula (8a,b) looks similar to a distance estimation.

The invention claimed is:

1. A method for determining a location ($L_i$) of a blind node i within a wireless communication system, the method comprising the steps of:
  receiving a plurality of over-the-air signals from j reference nodes having known locations;
  determining a plurality of locations ($L_{rj}$) for the j reference nodes;
  determining a plurality of path losses ($PL_{i,j}$) between the node i and the j reference nodes;
  determining a plurality of mathematical weights ($w_{i,j}$) based on the plurality of path losses;
  weighting the plurality of locations with the plurality of weights;
  calculating the location of the blind node i ($L_i$) based on the weighting; and
  wherein the step of calculating the location of the blind node i comprises the step of calculating:

$$L_i = \frac{\sum_j W_{i,j} * L_{rj}}{\sum_j W_{i,j}}.$$

2. The method of claim 1 wherein the step of determining the plurality of locations for the j reference nodes comprises the step of extracting the plurality locations from the plurality of over-the-air signals.

3. The method of claim 1 wherein the step of determining the plurality of path losses between node i and the j reference nodes comprises the step of determining a path loss between node i and each of the j reference nodes.

4. The method of claim 3 wherein the step of determining the path loss between the node i and each of the j reference nodes comprises the step of determining a difference between a transmitted power for each of the j reference nodes and the received signal strength of each reference node as measured by node i.

5. The method of claim 1 wherein the step of determining the plurality of locations $L_{rj}$, comprises the step of determining a plurality of locations $L_{rj}$, wherein $L_{rj}=(x_{rj},y_{rj},z_{rj})$.

6. The method of claim 5 wherein the step of calculating the location of the blind node ($L_i$) comprises the step of calculating $(x_i,y_i,z_i)$.

7. The method of claim 1 wherein the step of determining the plurality of mathematical weights $w_{i,j}$, comprises the step of determining $$w_{i,j}=(PL_{max}-PL_{i,j})^q,$$

wherein
$PL_{max}$ is a maximum possible path loss between a blind node and a reference node, and q is an exponent used to generate $w_{i,j}$ based on the propagation environment.

8. The method of claim 7 wherein a value of q is set based on a propagation model.

9. The method of claim 1 wherein the step of calculating the location of the blind node i comprises the step of calculating:

$$(x_i, y_i, z_i) = \frac{\sum_j w_{i,j} * (x_{rj}, y_{rj}, z_{rj})}{\sum_j w_{i,j}}, \quad (1)$$

where
$L_i=(x_i,y_i,z_i)$, and
$L_{r,j}=(X_{rj},Y_{rj},Z_{rj})$.

10. The method of claim 1 wherein the step of calculating the location of the blind node i comprises the step of calculating:

$$(x_i, y_i, z_i) = \frac{\sum_j w_{i,j} * (x_{rj}, y_{rj}, z_{rj})}{\sum_j w_{i,j}}, \quad (1)$$

where
$L_i=(x_i,y_i,z_i)$,
$L_{r,j}=(x_{rj},y_{rj},z_{rj})$,
$w_{i,j}=(PL_{max}-PL_{i,j})^q$,
wherein
$PL_{max}$ is a maximum possible path loss between a blind node and a reference node, and q is an exponent used to generate $w_{i,j}$ based on the propagation environment.

11. An apparatus for determining a location ($L_i$) of a blind node i within a wireless communication system, the apparatus comprising:

a receiver receiving a plurality of over-the-air signals from j reference nodes having known locations;

logic circuitry determining a plurality of locations ($L_{r,j}$) for the j reference nodes, determining a plurality of path losses ($PL_{i,j}$) between the node i and the j reference nodes, determining a plurality of mathematical weights ($w_{i,j}$) based on the plurality of path losses, weighting the plurality of locations with the plurality of weights, and calculating the location of the blind node i ($L_i$) based on the weighting; and wherein location of the blind node i is calculated as:

$$L_i = \frac{\sum_j w_{i,j} * L_{rj}}{\sum_j w_{i,j}}.$$

12. The apparatus of claim 11 wherein the logic circuitry determines the plurality of locations for the j reference nodes by extracting the plurality locations from the plurality of over-the-air signals.

13. The method of claim 11 wherein the logic circuitry determines the plurality of path losses between node i and the j reference nodes by determining a path loss between node i and each of the j reference nodes.

14. The apparatus of claim 13 wherein the logic circuitry determines the path loss between the node i and each of the j reference nodes by determining a difference between a transmitted power for each of the j reference nodes and the received signal strength of each reference node as measured by node i.

15. The apparatus of claim 11 wherein the logic circuitry determines the plurality of locations $L_{r,j}$ by determining a plurality of locations $L_{r,j}$, wherein $L_{r,j}=(x_{rj},y_{rj},z_{rj})$, and determines the location of the blind node ($L_i$) by calculating $(x_i,y_i,z_i)$.

* * * * *